July 7, 1959 E. W. SCHULTHEIS ET AL 2,893,653

MAGNETIC TAPE MACHINE

Filed May 24, 1956 7 Sheets-Sheet 1

INVENTORS
Eugene W. Schultheis
Robert M. Brumbaugh
BY
Flehr and Swain
ATTORNEYS

INVENTORS
Eugene W. Schultheis
Robert M. Brumbaugh
BY

ATTORNEYS

MAGNETIC TAPE MACHINE

Filed May 24, 1956 7 Sheets-Sheet 3

INVENTORS
Eugene W. Schultheis
Robert M. Brumbaugh
BY
Fletcher & Swain
ATTORNEYS INVENTORS
Eugene W. Schultheis
Robert M. Brumbaugh
BY
Fisher and Swain
ATTORNEYS INVENTORS
Eugene W. Schultheis
Robert M. Brumbaugh
BY
Flehr & Swain
ATTORNEYS INVENTORS
Eugene W. Schultheis
Robert M. Brumbaugh BY Flehr and Swain
ATTORNEYS INVENTORS
Eugene W. Schultheis
Robert M. Brumbaugh
BY Flehr & Swain
ATTORNEYS United States Patent Office 2,893,653

Patented July 7, 1959

2,893,653

MAGNETIC TAPE MACHINE

Eugene W. Schultheis, Berkeley, and Robert M. Brumbaugh, Menlo Park, Calif., assignors to Ampex Corporation, Redwood City, Calif., a corporation of California Application May 24, 1956, Serial No. 587,119

6 Claims. (Cl. 242—55.12)

This invention relates generally to magnetic tape machines used for record and/or play-back operations.

Conventional magnetic tape machines employ transport means including a rotatable tape reel holder and capstan means for driving the tape. Generally two tape reel holders are employed for mounting tape supply and take-up reels. In some instances the capstan means may drive the tape from one reel to the other with reliance upon a rewind operation to return the tape to the supply reel. In other instances the capstan means may be reversible to drive the tape in either direction. Particularly where the capstan means is constructed to rapidly start and stop the tape, it is desirable to maintain a tensioned tape loop between the supply reel and the capstan means, with suitable means for maintaining the loop, thereby facilitating rapid start and stop operations without undue tape tension or slack. In some instances the means serving to maintain such loops may serve to control servo means for driving the reel holders, as disclosed for example in co-pending application Serial No. 557,800, filed January 6, 1956, and now abandoned, and titled "Magnetic Tape Machine." Irrespective of the way in which the means employed for maintaining the tape loop is constructed, the use of such an arrangement complicates tape threading and removal operations. Thus assuming that flanged studs or rollers are employed for engaging the tape loop, in the manner disclosed in said co-pending application, the operator must thread the tape over the several studs or rollers, in addition to properly positioning the tape with respect to the capstan means.

It is an object of the present invention to provide a magnetic tape machine in which novel means is employed to facilitate such threading operations.

It is a further object of the invention to provide a magnetic tape machine of the type having capstan means capable of rapidly starting and stopping the tape, and which has novel manually operated means for positioning the tape loop engaging elements, for easy threading or removal of the tape.

Another object of the invention is to provide novel means to facilitate the threading of a machine of the type disclosed in the said co-pending application Serial No. 557,800.

Additional features of the invention will appear from the following description in which the preferred embodiment has been set forth in detail in conjunction with the accompanying drawing.

Referring to the drawing.

Figures 1, 2:
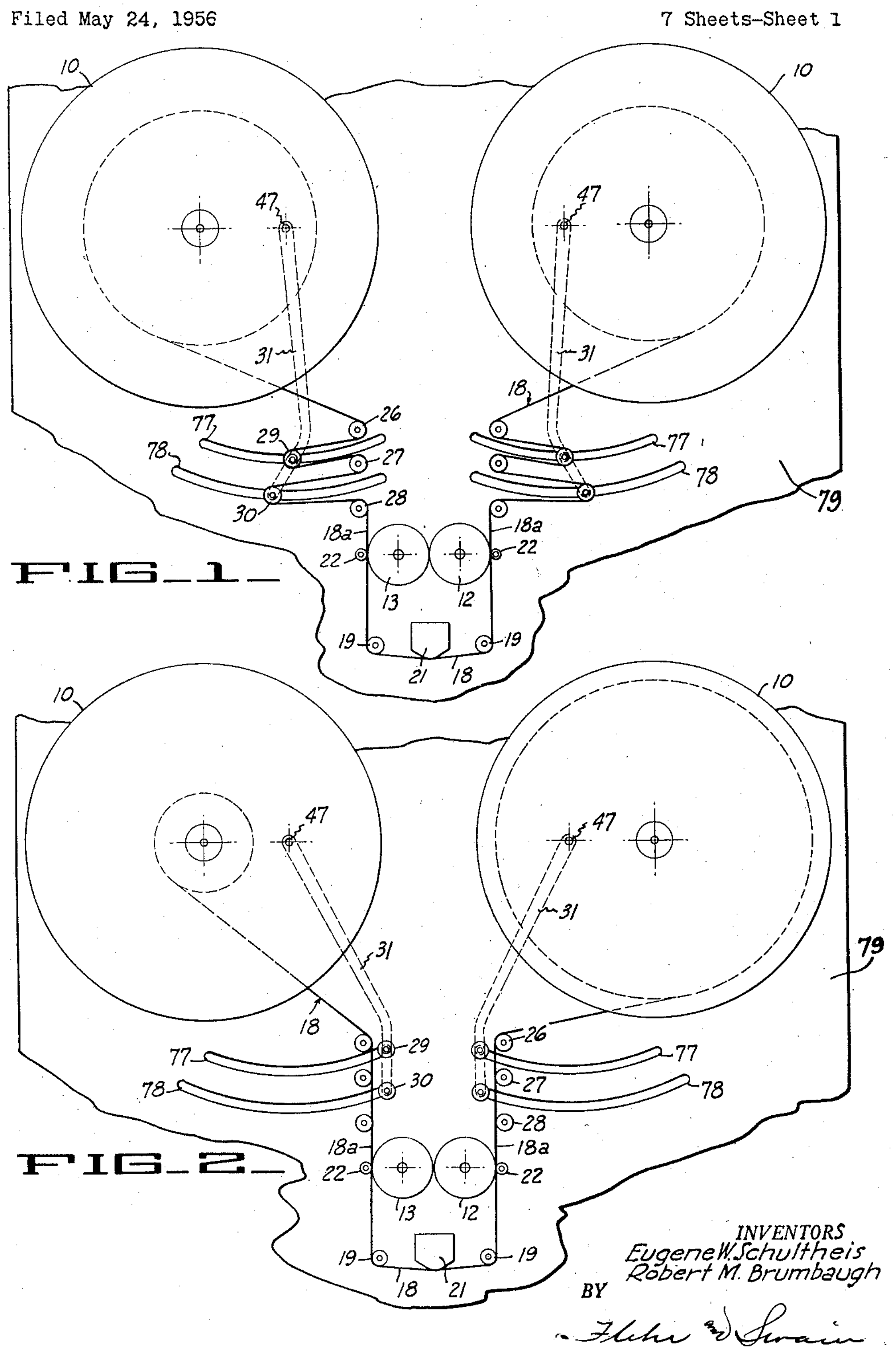
Figure 1 is a schematic view illustrating a magnetic tape machine incorporating the present invention.
Figure 2 is a view like Figure 1 but showing the tape loop engaging elements in a position for threading or removal of the tape.

Referring first to Figures 1 and 2, the machine schematically illustrated consists of tape reels 10 upon which the magnetic tape is wound. As is customary practice these reels are carried by turntables or other suitable tape reel holders. The motors for driving the turntables may be of a special type as will be presently described. Capstan driving means 11 engages that part of the tape extending between the two reels. In this instance the capstan means is of a type capable of rapid start and stop operations, and may be similar to driving means used in connection with tape transports for computers.

As illustrated the driving means consists of a driving capstan 12 that is connected to a suitable motor (later described) and associated with a second capstan 13. The capstan 13 is journaled upon a mounting arm 14 (Figure 3), that is pivotally secured at 16 to the mounting panel of the machine, and which is urged by the tension spring 17 whereby the periphery of the capstan 13 is urged into frictional driving relation with the periphery of capstan 12.

The magnetic tape 18 is looped over the flanged studs or rollers 19, and is adapted to engage the magnetic head 21. The two portions 18*a* of the tape extend in close proximity with the peripheries of the capstans 12 and 13, and are adapted to be pressed against these capstans by the rollers 22. Suitable means such as solenoids 23 (Figure 3) are provided whereby when energized the associated roller presses the tape into driving relation with the associated capstan. As illustrated each roller 22 can be carried by the free end of a spring arm or reed 24, whereby it is normally retracted from contact with the tape, and whereby when the solenoid is energized it is urged against the tape so that the tape is driven by the associated capstan.

Assuming that capstans 12 and 13 are driven continuously at a constant speed, it will be evident that the tape can be rapidly started and stopped by energizing one or the other of the solenoids 23. When the right hand solenoid 23 is energized the tape is driven by capstan 12 whereby the tape is supplied from the left hand reel 10, and taken up by the right hand reel 10. When the left hand solenoid 23 is energized, the tape is pressed into driving relation with the capstan 13, and is driven in an opposite direction.

Figure 3:
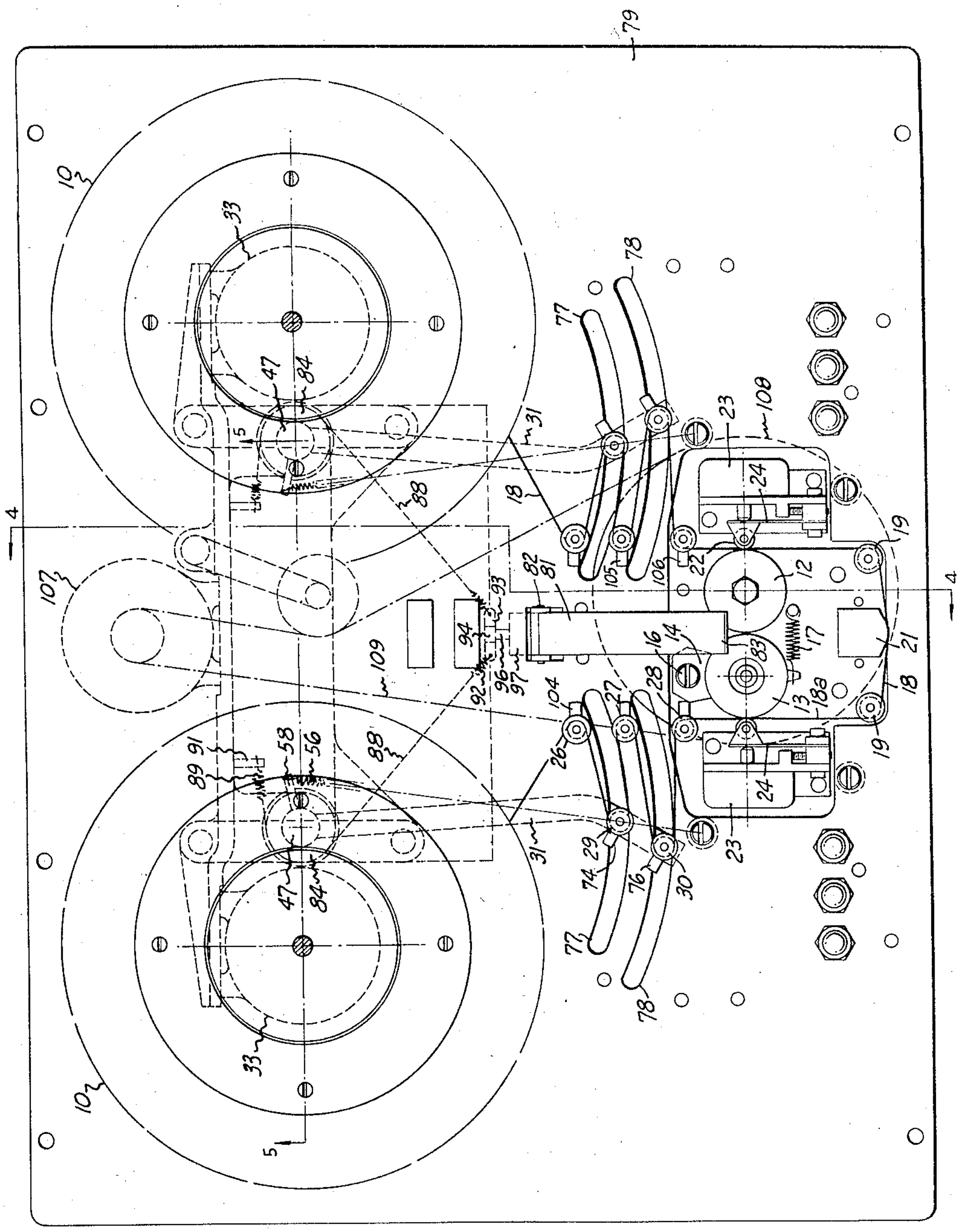
Figure 3 is a plan view of a machine incorporating the present invention, with certain parts being shown in dotted lines.

Means are provided for yieldably maintaining tape loops in the lengths of tape that extend from the capstan means to both of the reels. Each such means consist of stationary flanged studs or rollers 26, 27 and 28, together with movable flanged studs or rollers 29 and 30. Normally the tape is looped zigzag fashion over the studs as illustrated in Figures 1—3. The studs 29 and 30 are carried by a movable member 31 in the form of a take-up arm that is urged in such a manner as to yieldably hold the looped tape under predetermined tension.

Figure 10:
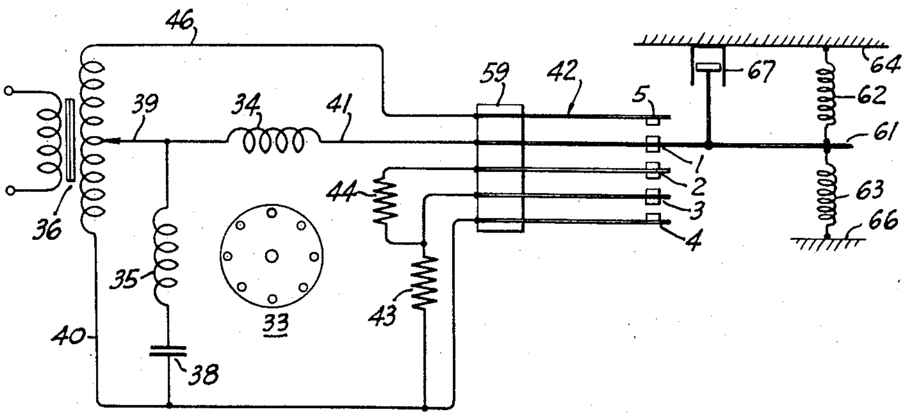
Figure 10 is a circuit diagram for the servo drive.

Assuming use of servo means of the type disclosed in said co-pending application 557,800, each of the turntable motors 33 (Figures 5 and 6), indicated schematically in the circuit diagram of Figure 10, can be of the reversible alternating current type, provided with windings 34 and 35 adapted to be energized by alternating currents. The circuitry for each motor (Figure 10) may consist of an alternating current transformer 36 having its primary connected to a source of alternating current, such as the usual 60 cycle 110 volt current supply. The tapped secondary of this transformer provides 180 degree out of phase voltages. The winding 35 of the motor, which can be referred to as the lead winding, is connected in series with condenser 38 between the transformer leads 39 and 40. Thus the winding 35 is continuously energized although of itself it does not develop motor torque. A winding 34 is connected in series with the leads 39 and 41 and its excitation is controlled by the multi-contact switch 42. Contact 1 of this switch connects to lead 41, contact 4 to lead 40, contact 3 to lead 40 in series with resistor 43, and contact 2 to lead 40 in series with both resistors 43 and 44. Assuming that all the contacts are mounted on leaf springs, deflection of contact 1 in one direction first makes connection with contact 2, thus connecting the winding 34 across the leads 39 and 40, in series with both resistors 44 and 43. Further deflection causes all three contacts 1, 2 and 3 to close, thus shutting out resistor 44, and leaving the winding 34 connected across leads 39 and 40 in series with resistor 43. A further deflection of contact 1 closes the four contacts 1, 2, 3 and 4 thus directly connecting winding 34 across the leads 39 and 40. Deflection of contact 1 in the opposite direction causes it to make connection with contact 5, and this connects the winding 34 across the transformer leads 39 and 46.

Figures 4, 7, 12:
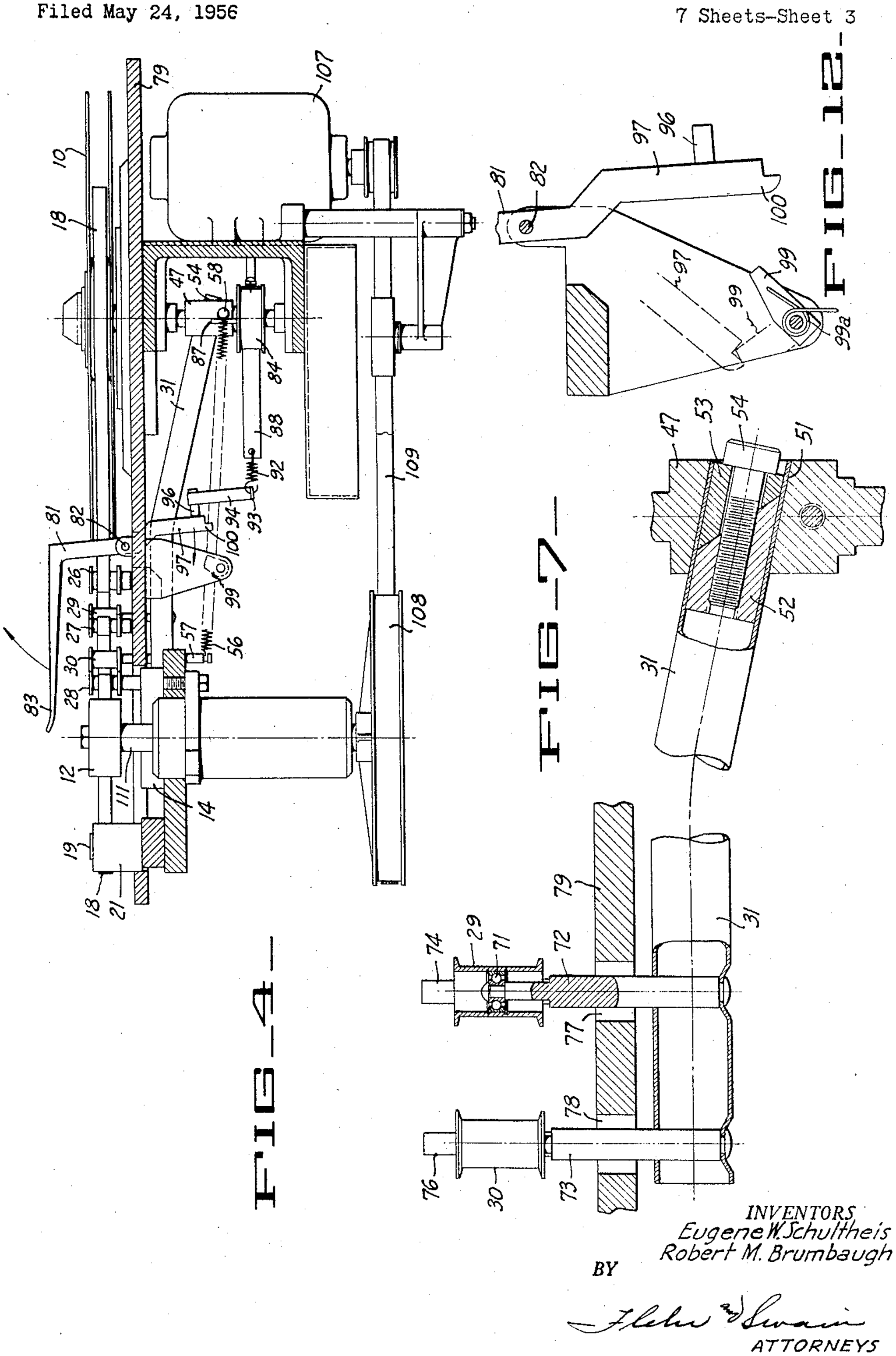
Figure 4 is a cross-sectional detail taken along the line 4—4 of Figure 3.
Figure 7 is a detail in section illustrating suitable means for attaching the take-up arms to the associated shafts, also showing guide fingers associated with the movable elements.
Figure 12 is a detail on an enlarged scale showing latch means for retaining the threading lever.

Each arm 31 is carried by a shaft 47 that is journaled to turn on an axis parallel to the axis of the associated reel 10. The upper and lower ends of the shaft are shown journaled by the ball bearing assemblies 48 and 49. The arms 31 can be made tubular as illustrated in Figure 7, with their ends seated within the bores 51 formed transversely of the shafts 47. The particular clamping means illustrated in Figure 7 includes the oppositely inclined expanding plugs 52 and 53, which are urged together by the clamping screw 54.

Each shaft 47 is yieldably urged to rotate in one direction by a tension spring 56. One end of each spring is shown attached to the fixed anchoring pin 57, and the other end is connected to an arm 58 which in turn is fixed to shaft 47.

Figure 5:
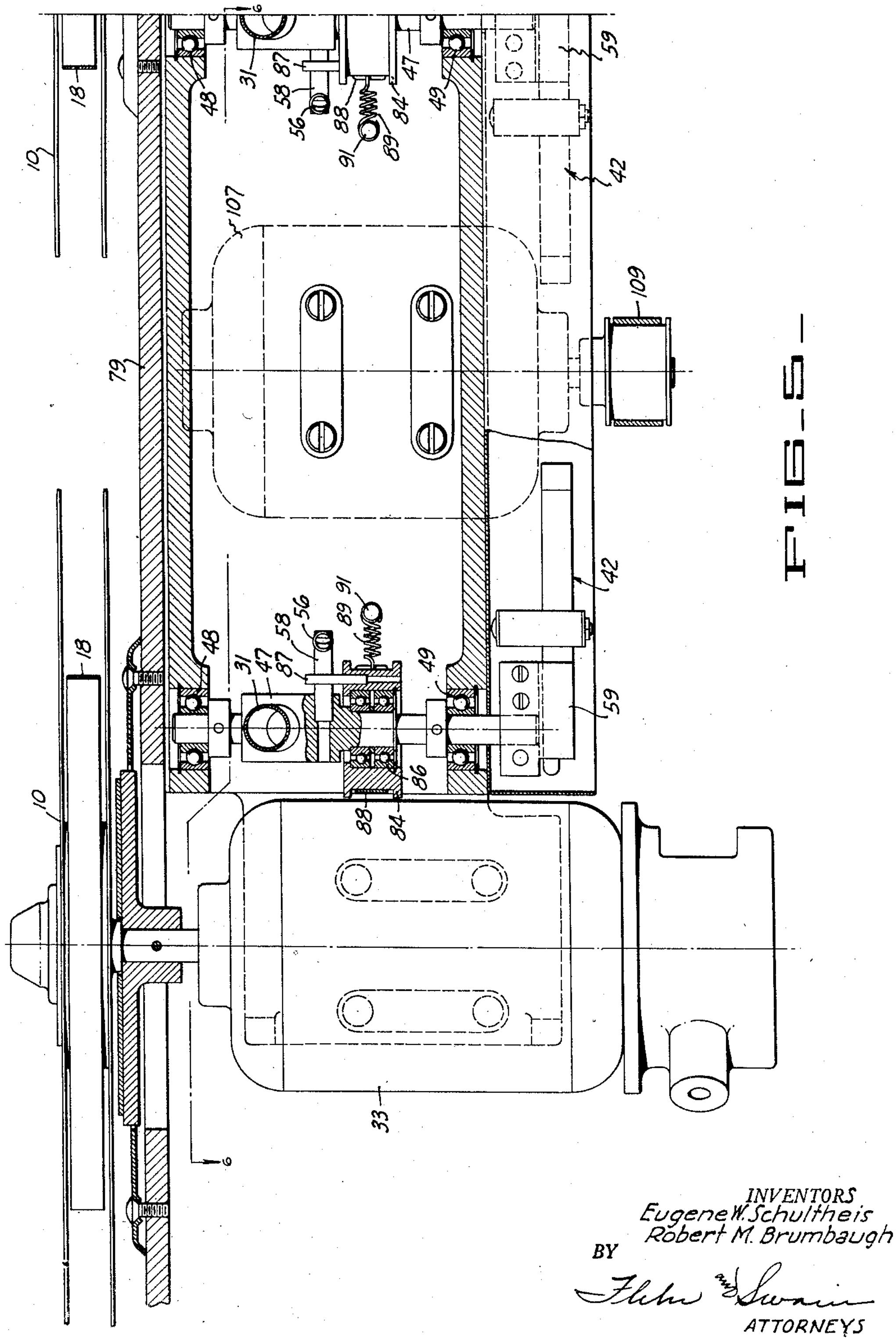
Figure 5 is a cross-sectional detail taken along the line 5—5 of Figure 3.
Figure 6:
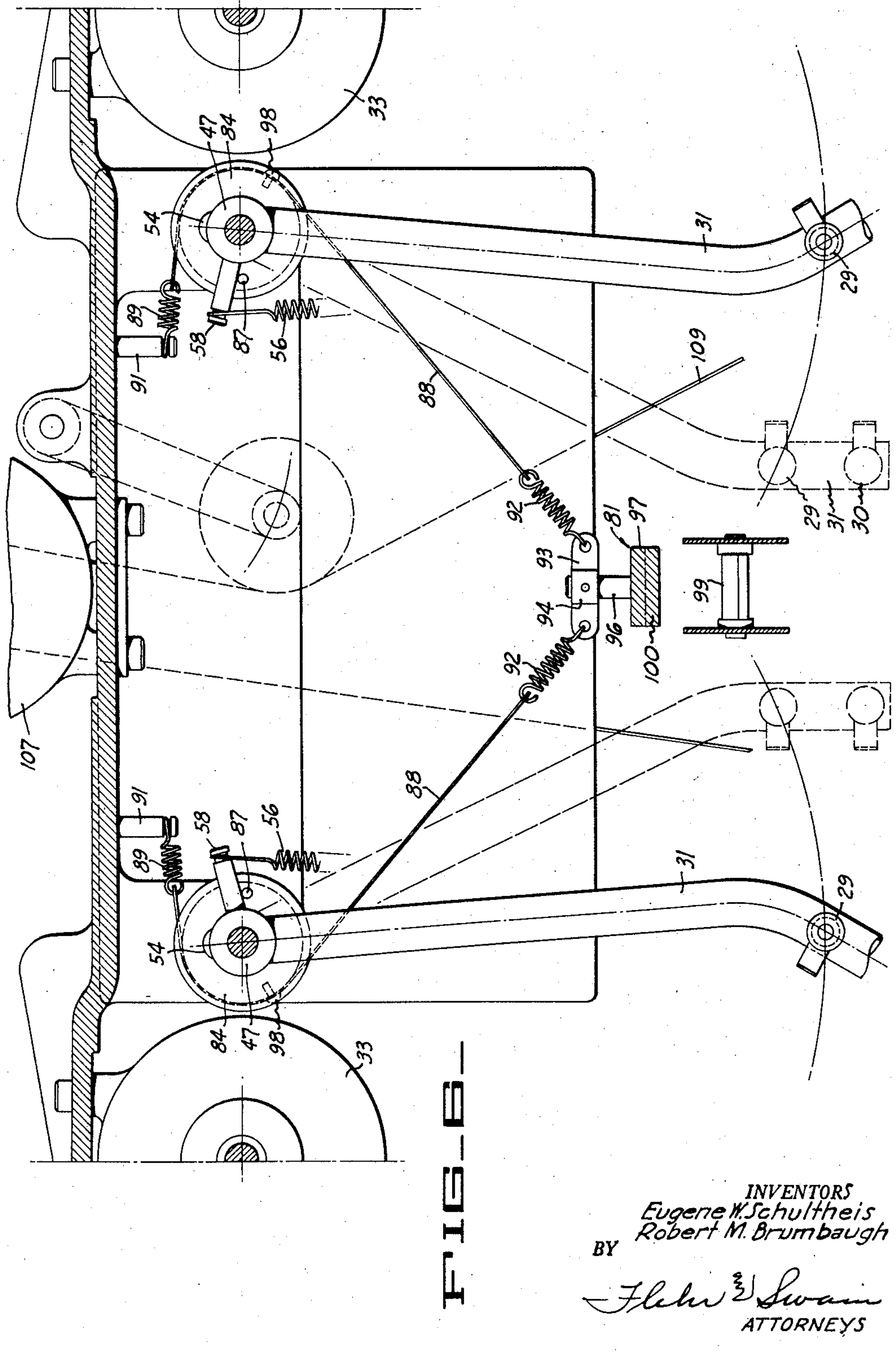
Figure 6 is a detail, partly in section, and indicating certain parts in plan, the section being taken along the line 6—6 of Figure 5.

As shown in Figures 5 and 10 each switch 42 is associated with a take-up arm 31 whereby its contact 1 is deflected in one direction or the other in response to movements of the arm. Thus each switch may have its mounting base 59 secured to the shaft 47 (Figures 5 and 10), and its switch contact 1 carries a finger 61 which is attached to the so-called centering springs 62 and 63. The springs have their remote ends anchored to fixed points 64 and 66. In order to provide servo stability and to eliminate contact bounce or hunting it is desirable to connect damping or dash-pot means to contact 1. Thus as shown in Figure 10, a simple dash-pot 67 is shown with its movable element mechanically connected to the finger 61. The force exerted by the dash-pot 67 to the finger 61 and contact 1 is proportional to the velocity of arm 31 in motion.

With relatively rapid displacement of arm 31 the dash-pot exerts force on contact 1 tending to cause it to close with contacts 2 or 5. For slow displacements the force exerted by the dash-pot is negligible and does not affect the direction of closure of contact 1 with the cooperating contacts.

The guide rollers 29 and 30 may be constructed and mounted upon the arm 31 in the manner illustrated in Figure 7. Thus each roller is made hollow, and has its medial portion journaled by ball bearing assembly 71 to the upper end of the mounting pin 72. The ball bearing assembly is designed to permit limited universal angular movement between the roller and the pin 71, thus providing a self-aligning action. Roller 30 is similarly journaled upon pin 73. The two pins 72 and 73 are firmly attached to the free end of the take-up arm 31. The two mounting pins 72 and 73 preferably carry the tape retaining fingers 74 and 76, which extend upwardly from the lower ends of the rollers 29 and 30 at an inclination to the vertical. As will be presently explained these fingers facilitate quick threading operations.

The roller mounting pins 72 and 73 for each of the arms 31 extend through the accommodating slots 77 and 78 (Figure 3), formed in the top panel 79 of the machine. The slots are of sufficient length to accommodate the desired movements of the arms 31, and their ends form limiting stops that are engaged by the pins 72 and 73. As shown in Figure 3 the springs 56 urge the two arms 31 toward the center of the machine, or in other words the left hand arm is urged counter clockwise, the right hand arm clockwise. For the limiting positions of the arms 31 illustrated schematically in Figure 2, the line of centers of the stationary elements 26, 27 and 28 is spaced outwardly of and generally parallel to the line of centers of the rollers or guide elements 29 and 30. Thus a space is provided between the stationary and movable tape engaging elements into which a substantially straight length tape can be dropped for a quick threading operation.

Manually operated means is provided for moving the arms 31 to the limiting positions just described. This means consists of a lever 81 (Figure 4) having a pivotal mounting 82 to the top panel 79, and having a handle 83 by means of which the lever may be swung from the normal position shown in Figure 4, to a rear position for a threading operation. Collars 84 are carried by a ball bearing assembly 86 upon the shafts 47 (Figure 5). Each collar is provided with a pin 87 adapted to engage the corresponding pin 58. Flexible metal cables or bands 88 (Figures 3 and 6) engage about the peripheries of collars 84 and are operatively connected to the lever 81. Thus corresponding ends of these bands connect with tension springs 89 (Figure 6) which in turn are secured to the fixed anchoring pins 91. The other ends of the cables connect with tension springs 92, which in turn are attached to the equalizer bar 93. Bar 93 is carried by the lower end of the arm 94 (Figure 4) the upper end of which is attached by pivot 96 to the portion 97 of the lever 81. Bands 88 have points 98 of attachment to the collars 84 whereby for the normal position of lever 81 as shown in Figure 4, pins 87 are retracted with respect to arms 58, thus permitting free movement of the take-up arms 31 as required by normal operation of the machine. When handle 83 is moved upwardly and rearwardly the two collars 84 are rotated in opposite directions and pins 87 engage with arms 58 whereby the two shafts 47 and their corresponding arms 31 are rotated to the limiting position shown in Figure 2. Lever 81 can releasably be latched in its raised position by latch 99 which engages the end 100 of portion 97. Latch 99 is yieldably urged in a clockwise direction to the position shown in Figure 12 by a spring 99*a*. When lever 83 is swung to bring portion 100 past latch 99 and then permitted a small amount of return movement, the latch forms a releasable detent as shown in dotted lines in Figure 12. Thereafter when lever 83 is moved to its rearward limiting position it permits the latch to escape to the position shown in solid lines, whereby the lever may now be returned to normal position.

Figure 9:
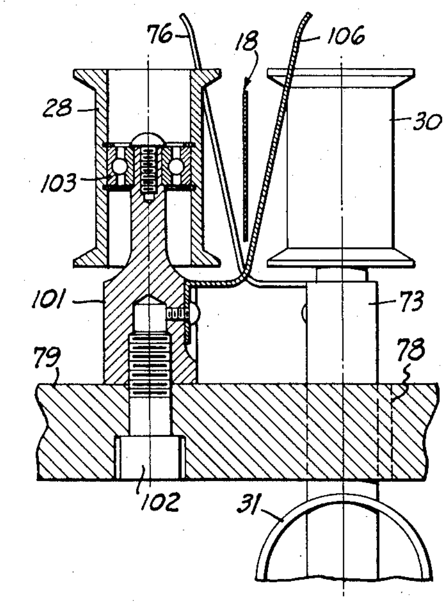
Figure 9 is a schematic section taken along the line 9—9 of Figure 8.
Figure 8:
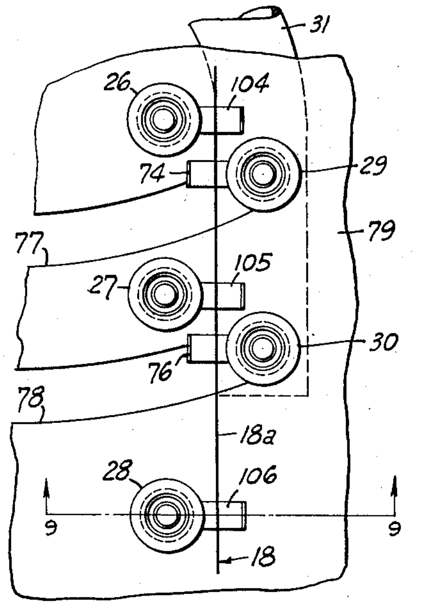
Figure 8 is a detail in plan illustrating the manner in which a length of tape is threaded between the stationary and movable tape engaging elements.

The stationary tape engaging elements 26, 27 and 28 can be formed substantially as illustrated in Figures 8 and 9. Thus elements 28 can consist of a vertical mounting pin 101 secured by a screw 102, and having a ball bearing assembly 103 forming a bearing (with universal self-aligning action) between its upper end and the medial portion of the associated guide roller. Here again tape deflecting fingers 104, 105, and 106 are mounted upon the pins 101. The positioning of the fingers 104–106 with respect to the fingers 74 and 76, can be seen in Figures 8 and 9.

Figure 11:
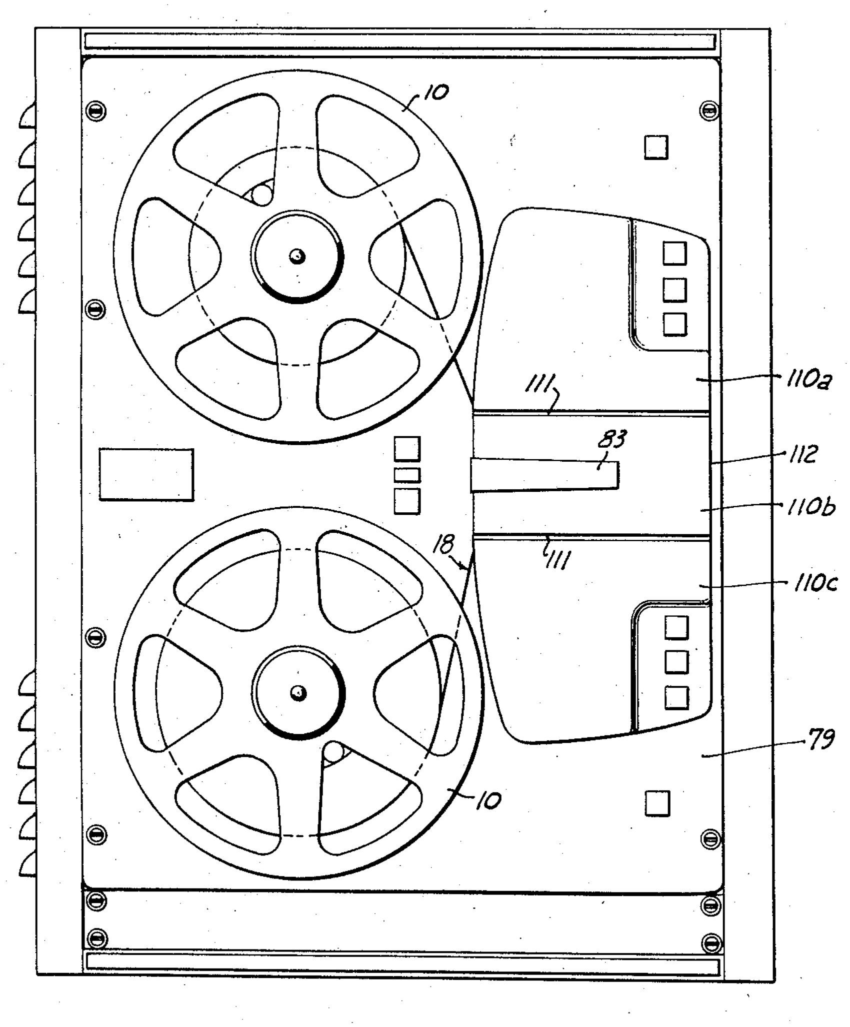
Figure 11 is a view looking toward the mounting panel and showing covers for certain parts.

As shown in Figure 11 it is desirable to provide covers or housings for the capstan drive and associated parts. Thus cover parts 110*a*, 110*b* and 110*c* are removably secured to the panel 79 and they are formed to provide slots 111 through which the tape may pass. The edge 112 of part 110*b* is a lip overlying the magnetic head 21 and rollers 19. Also this part is recessed to accommodate the lever 83. The slots guide the tape during threading operations.

Any suitable driving means can be provided for the capstans 12 and 13. Thus a motor 107 (Figure 4) is connected to a pulley 108 by belt 109, and the pulley is mounted on the lower end of the shaft 111 for capstan 12.

The operation of the apparatus described above is as follows: assuming first that the tape is in static condition, or in other words it is not being driven in one direction or the other by the capstan means, all of the tape extending between the reels 10 is maintained under tension by virtue of the tension springs 56, which urge the take-up arms 31 outwardly. Likewise under such static condition contact 1 of each switch 42 is closed with respect to contact 4 (or contacts 2 and 3 depending upon the reel load), whereby winding 34 of each motor is energized in conjunction with the corresponding winding 35 to provide sufficient torque to maintain tape tension against the springs 56. Assuming that the tape is rapidly started toward the right by energizing the right hand solenoid 23, both of the take-up arms 31 are shifted from their static positions. The looped portions of the tape for the right hand arm lengthen and the loops associated with the left hand arm decrease in length. The switch 42 associated with the right hand take-up arm 31 is conditioned whereby all of the contacts 1, 2, 3 and 4 are momentarily closed, thus causing the winding 34 of the motor 33 associated with the right hand reel to rapidly accelerate in a direction to wind up the tape. Under such conditions the increased excitation of winding 34 from the lower side of the transformer secondary serves to increase the motor torque. Before the loops have extended to their maximum length as determined by the limiting position of arm 31, the rate with which the tape is wound is increased to a point sufficient to shorten the tape loops, thus bringing the arm 31 back to a location near a normal operating position. By that time the tape has been accelerated by the capstan means to its maximum normal operating speed, and thereafter the arm 31 remains in a position near centering position, and with closing of contacts 1 and 3, or contacts 1, 2 and 3, whereby the torque serving to rotate the take-up reel is adequate to wind up the tape without slack, irrespective of the diameter of the tape roll.

As previously mentioned during rapid starting of the tape by the capstan driving means, the tape loops upon the left hand side of the machine are shortened, with a result that for this condition the contacts 1 and 2 are opened and contacts 1 and 5 are momentarily closed to energize winding 34 from the upper side of the transformers secondary, whereby the torque is reversed to rotate the associated reel in a direction to unwind the tape. The reel is rapidly accelerated to a speed somewhat greater than that required for supplying the tape to the capstan driving means, during normal operation, with the result that the loops of the tape are immediately lengthened with return of the arm 31 to a location at or near normal operating position. During subsequent normal operation the contact 1 is closed with respect to contact 2, or contacts 2 and 3, to maintain proper back tension irrespective of changes in the diameter of the unwinding tape roll.

The operation described above is reversed when the tape is driven in the reverse direction by energizing the left hand solenoid 23. Irrespective of the direction of drive the servo means associated with the turntables maintains a tape tension relatively constant, and avoids conditions of undue tape slack or tension.

Assuming that it is desired to remove a tape from the machine or to apply a new tape, the operator swings the handle 83 upwardly and rearwardly, with the result that the metal ribbons 88 cause sufficient rotation of the collars 84 to rotate the shafts 47 together with arms 31 to the limiting positions shown in Figures 8 and 9. Under such conditions the length of tape extending from the capstan means to the reels is no longer looped, and may be lifted from the guide elements 26–30 through the slots 111. To thread a new tape upon the machine, the reels 10 are applied to the turntables, and lengths of the tape are dropped through slots 111 between the inclined guide fingers 74 and 76, and 104–106, and the tape is engaged with the guide rollers 19 and 22 associated with the capstan drive. The tape is now held in such a position with respect to the rollers 26–30 that when the handle 53 is returned to the normal position shown in solid lines in Figure 4, the arms 31 are again urged outwardly and by the tension springs 56 to maintain tape tension in the manner previously described. When the handle 83 is in its normal position the arms 31 and shafts 47 are free to rotate, to thereby control the servo means in the desired manner, because the pins 87 are at all times spaced from the arms 58.

It will be evident from the foregoing that we have provided a magnetic tape machine which maintains loops of tape under tension, but which at the same time can be readily threaded by the operator.

We claim:

1. In a magnetic tape machine, a tape transport means including a pair of rotatable tape reel holders and capstan means for driving the tape, two pairs of stationary and movable tape engaging elements over which the two lengths of the tape extending from the reels to the capstan means are looped, two movable members serving to mount the movable elements of each pair, yieldable means for urging said members to lengthen the tape loops associated with the same, each of said members being movable against said yieldable means to a limiting position in which the tape may be positioned between the stationary and movable elements of the associated pair without looping, a single hand lever, and means connecting said hand lever to said members for moving both said members to said limiting positions responsive to movement of the hand lever to facilitate quick threading of the tape with respect to said elements.

2. A machine as in claim 1 in which said last named means includes parts brought into abutment to move said members to said limiting positions, said parts being normally spaced to permit free movements of said members for normal tape tensioning.

3. In a magnetic tape machine, tape transport means including a rotatable tape reel holder and capstan means for engaging and driving the tape, at least two stationary and one movable tape engaging elements over which that length of the tape extending from the reel to the capstan means is looped, a movable member serving to mount the movable element, yieldable means for urging said member in a direction to lengthen the tape loop, said member being movable against the said yieldable means to a limiting position in which a portion of the tape may be loosely positioned between the stationary and movable elements without engaging said elements and without looping, and means serving to direct and support a portion of the tape between said elements when said member is in its said limiting position, said last means serving to support said tape portion in position for automatic engagement with said elements when said member is moved from said limiting position.

4. A machine as in claim 3 in which said last means comprises stationary and movable fingers, the movable fingers being carried in fixed relationship with said movable elements, said fingers for said limiting position of said member being interleaved with respect to the space extending between said elements to direct and support said portion of the tape.

5. In a magnetic tape machine, tape transport means including a rotatable tape reel holder and capstan means for engaging and driving the tape, at least two stationary and one movable tape engaging elements over which that length of the tape extending from the reel to the capstan means is looped, a movable member serving to mount the movable element, yieldable means for urging said member in a direction to lengthen the tape loop, said member being movable against the said yieldable means to a limiting position in which a linear portion of the tape may be loosely positioned between the stationary and movable elements without engagement with said elements and without looping, means for moving said member against said yieldable means to said limiting position of the same to facilitate threading of the tape with respect to said elements, a cover enclosing said elements, said cover having a slot therein to receive said portion of the tape, tape directing fingers mounted in fixed relation with said stationary elements and positioned to extend on one side of the general plane of said slot, and tape directing fingers mounted in fixed relation with said movable elements and positioned to extend upon the other side of said plane for said limiting position of said member.

6. In a magnetic tape machine, tape transport means including a rotatable tape reel holder and capstan means for engaging and driving the tape, a stationary and movable tape engaging element over which that length of the tape extending from the reel to the capstan means is looped, a movable member serving to mount a movable element, yieldable means for urging said member in a direction to lengthen the tape loop, said member being movable against the said yieldable means to a limiting position in which a portion of the tape may be loosely positioned between the stationary and movable elements without engaging the same with said elements and without looping, and manually operable means for moving said member against said yieldable urging means to said limiting position to thereby facilitate threading of the tape with respect to said elements, said last means including a hand lever movable in opposite directions between normal and actuated positions, and means including parts brought into abutment forming a connection between the hand lever and said movable member to move the latter to said limiting position when the hand lever is moved to said actuated position, said parts being separated for the normal position of the hand lever to permit free movements of said member for normal tape tensioning.

References Cited in the file of this patent

UNITED STATES PATENTS

| | | |
|---|---|---|
| 1,177,636 | Kuehn | Apr. 4, 1916 |
| 2,229,480 | Spencer et al. | Jan. 21, 1941 |
| 2,628,039 | Watts | Feb. 10, 1953 |
| 2,656,129 | De Turk et al. | Oct. 20, 1953 |
| 2,714,268 | Battey | Aug. 2, 1955 |
| 2,745,604 | Masterson | May 15, 1956 |